Figure 1:
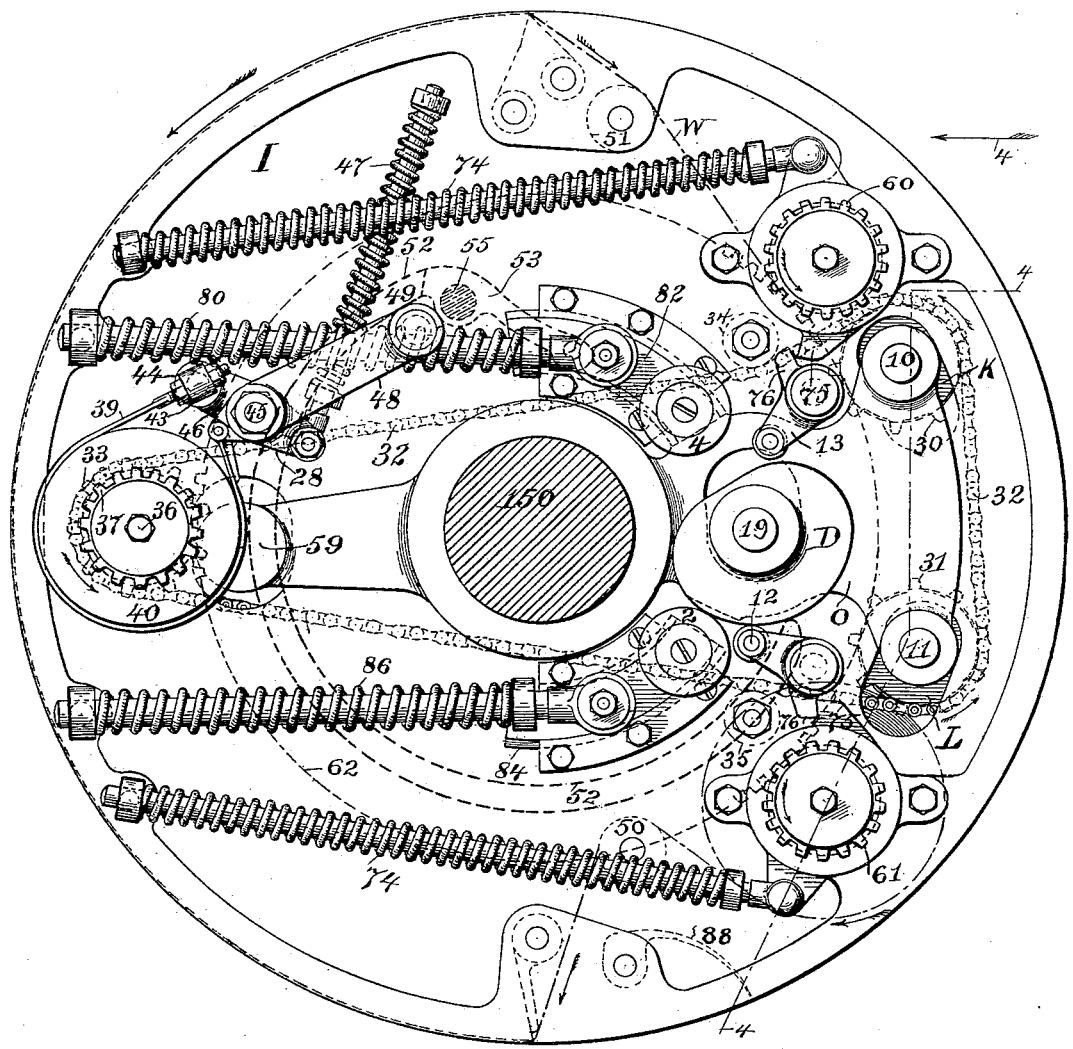

No. 618,058. Patented Jan. 24, 1899.
L. C. CROWELL.
TYMPAN SHIFTING MECHANISM.
(Application filed Oct. 16, 1895.)

(No Model.) 10 Sheets—Sheet 1.

Attest:
S. Winthal
A. V. Bourke

Inventor.
Luther C. Crowell
by Philipp Munson & Phelps,
atty's.

No. 618,058. Patented Jan. 24, 1899.
L. C. CROWELL.
TYMPAN SHIFTING MECHANISM.
(Application filed Oct. 16, 1895.)

(No Model.) 10 Sheets—Sheet 2.

Attest:
S. Winthal
A V Bourke

Inventor,
Luther C Crowell
by Philipp Munson & Phelps
atty's

No. 618,058. Patented Jan. 24, 1899.
L. C. CROWELL.
TYMPAN SHIFTING MECHANISM.
(Application filed Oct. 16, 1895.)

(No Model.) 10 Sheets—Sheet 4.

No. 618,058. Patented Jan. 24, 1899.
L. C. CROWELL.
TYMPAN SHIFTING MECHANISM.
(Application filed Oct. 16, 1895.)
(No Model.) 10 Sheets—Sheet 5.
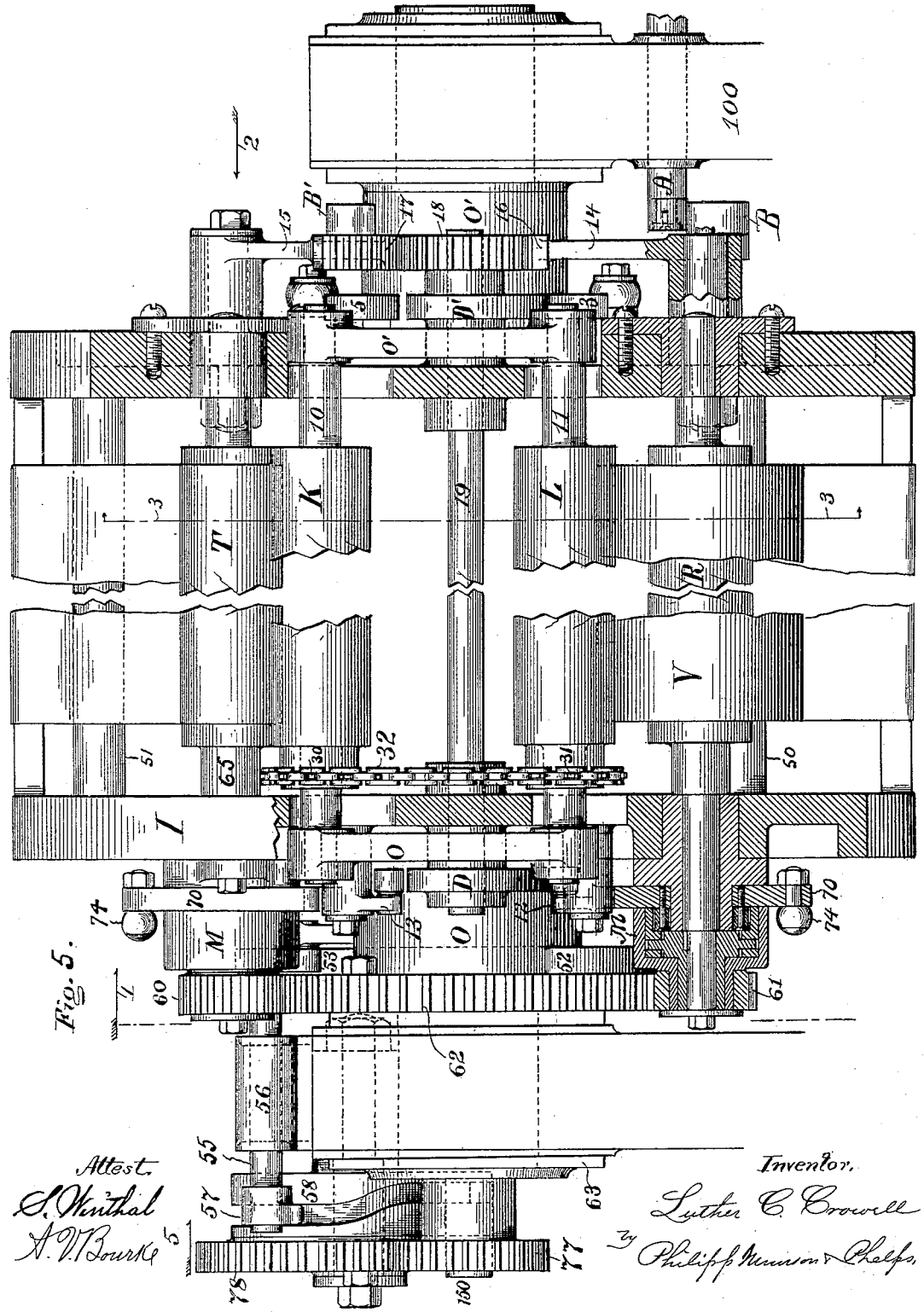

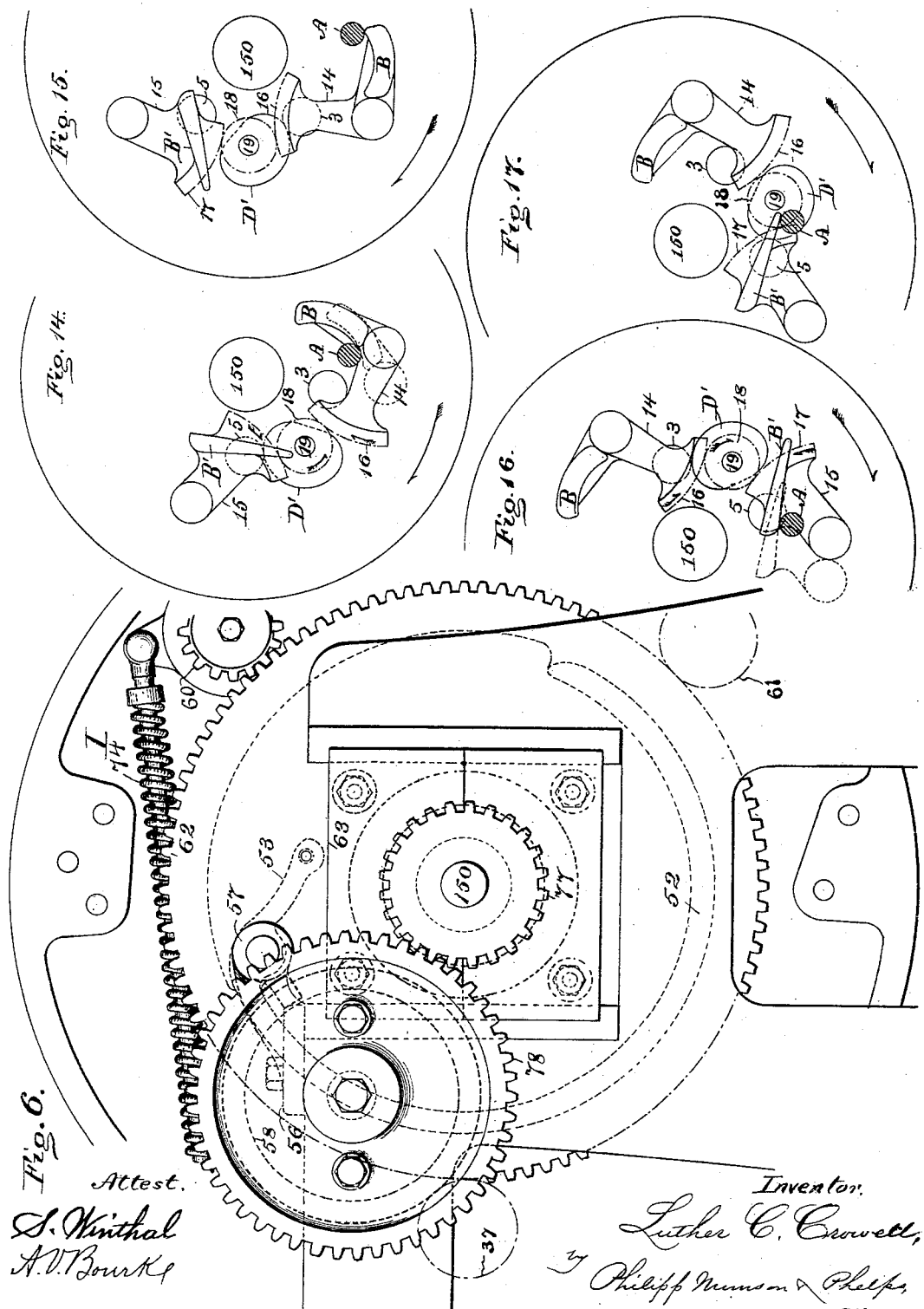

No. 618,058. Patented Jan. 24, 1899.
L. C. CROWELL.
TYMPAN SHIFTING MECHANISM.
(Application filed Oct. 16, 1895.)
(No Model.) 10 Sheets—Sheet 7.
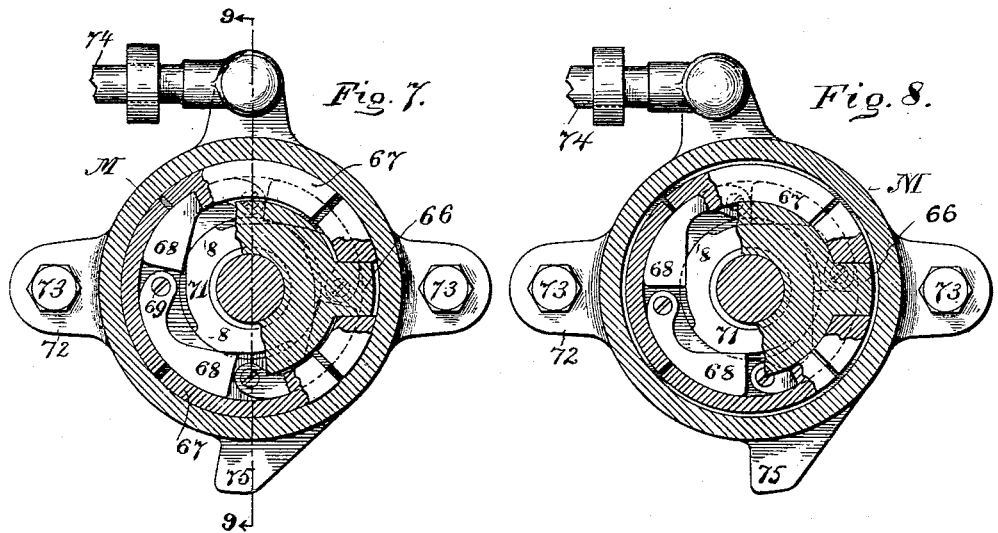
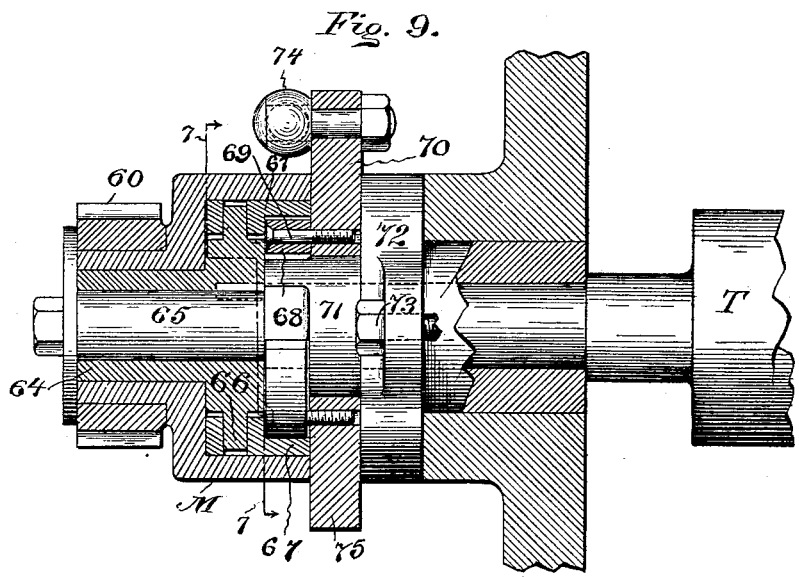

No. 618,058. Patented Jan. 24, 1899.
L. C. CROWELL.
TYMPAN SHIFTING MECHANISM.
(Application filed Oct. 16, 1895.)
(No Model.) 10 Sheets—Sheet 8.
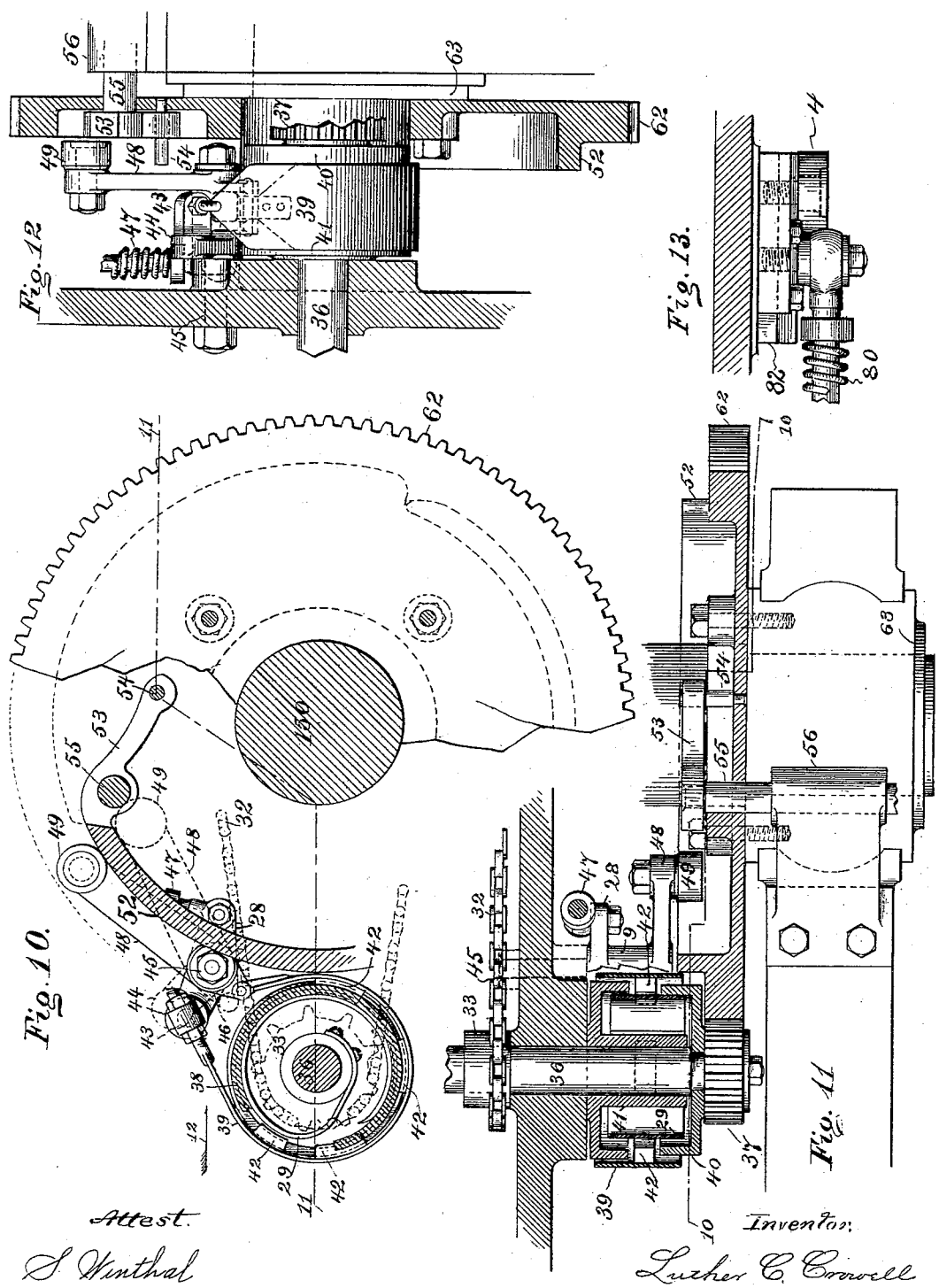
Attest.
S. Winthal
H. V. Bourke
Inventor:
Luther C. Crowell
by Philipp Munson & Phelps.
THE NORRIS PETERS CO., PHOTO-LITHO., WASHINGTON, D. C.

No. 618,058. Patented Jan. 24, 1899.
L. C. CROWELL.
TYMPAN SHIFTING MECHANISM.
(Application filed Oct. 16, 1895.)
(No Model.) 10 Sheets—Sheet 9.
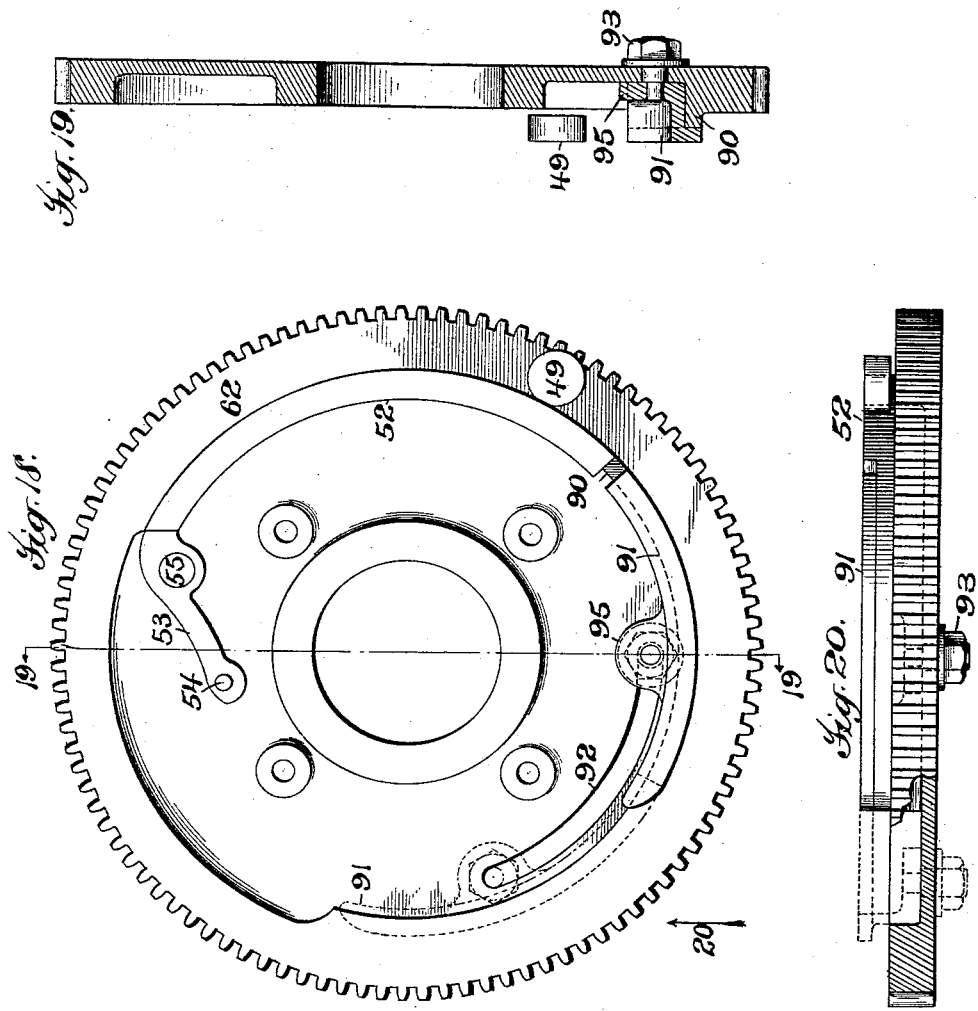

No. 618,058. Patented Jan. 24, 1899.
L. C. CROWELL.
TYMPAN SHIFTING MECHANISM.
(Application filed Oct. 16, 1895.)
(No Model.) 10 Sheets—Sheet 10.
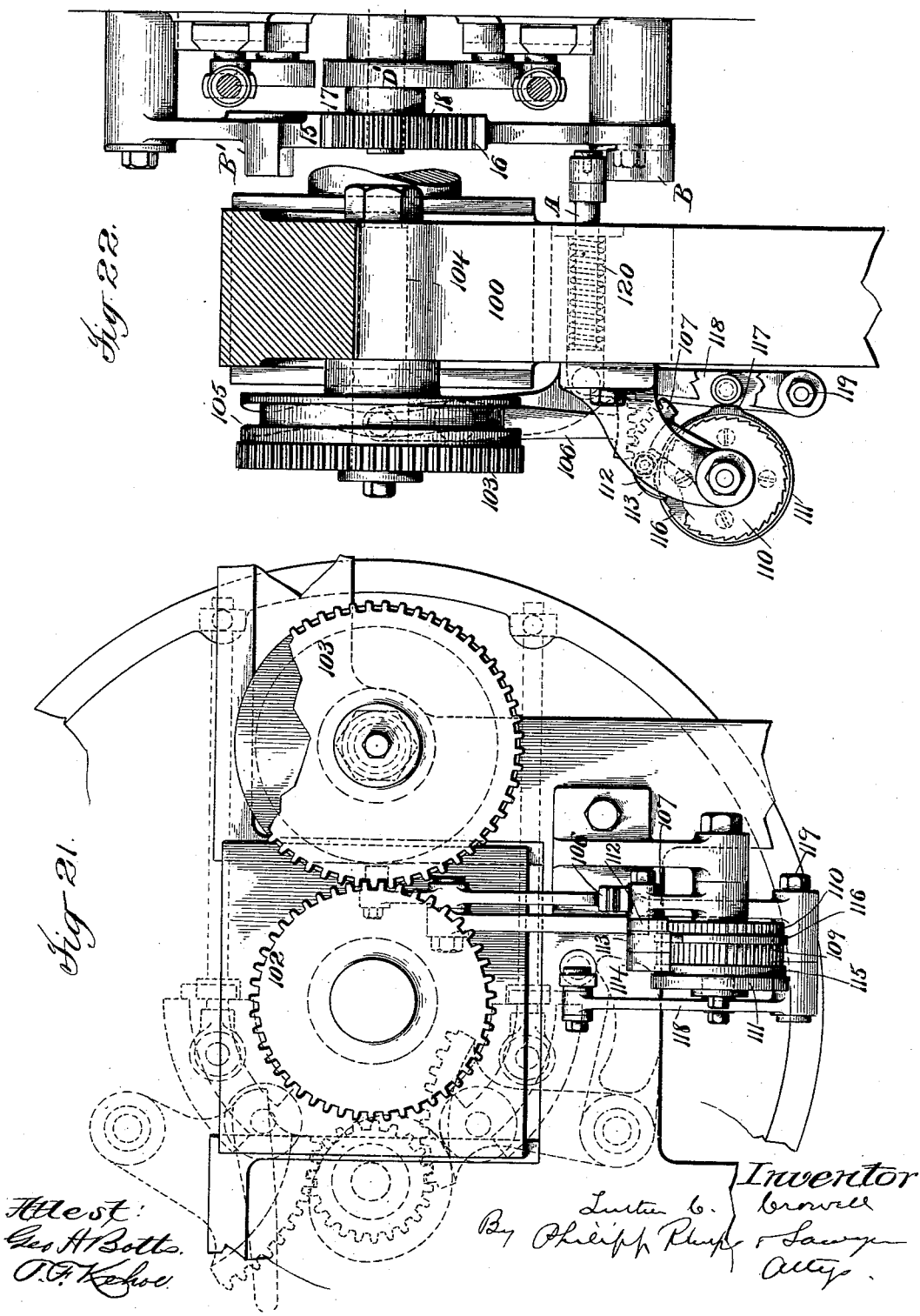

United States Patent Office.

LUTHER C. CROWELL, OF NEW YORK, N. Y., ASSIGNOR TO ROBERT HOE, THEODORE H. MEAD, AND CHARLES W. CARPENTER, OF SAME PLACE.

TYMPAN-SHIFTING MECHANISM.

SPECIFICATION forming part of Letters Patent No. 618,058, dated January 24, 1899.

Application filed October 16, 1895. Serial No. 565,905. (No model.)

*To all whom it may concern:*

Be it known that I, LUTHER C. CROWELL, a citizen of the United States, residing at New York, (Brooklyn,) county of Kings, and State of New York, have invented certain new and useful Improvements in Tympan - Shifting Mechanism, fully described and represented in the following specification and the accompanying drawings, forming a part of the same.

The object of this invention is to provide the second impression-surface of a perfecting printing-machine, such as a two-revolution flat-bed printing-machine, with a tympan or offset covering in the form of a long sheet or web hereinafter called the "tympan," and with a tympan-shifting mechanism whereby a clean portion of said tympan, equal at least to the extent of the impression-surface of the cylinder used in the printing operation, and which may be called the "printing-surface," may be presented for each sheet printed, which in the example referred to will be at every second revolution of the impression-cylinders, whereby the offset from the freshly-printed sheet is taken up and each sheet printed upon is protected from being soiled.

The invention consists in the structure and combination of mechanisms whereby the aforesaid object is carried out or practically embodied, all of which is so specifically hereinafter explained and claimed as to need no further preliminary description.

One practical embodiment of the invention is illustrated in the accompanying drawings, wherein—

Figure 2:
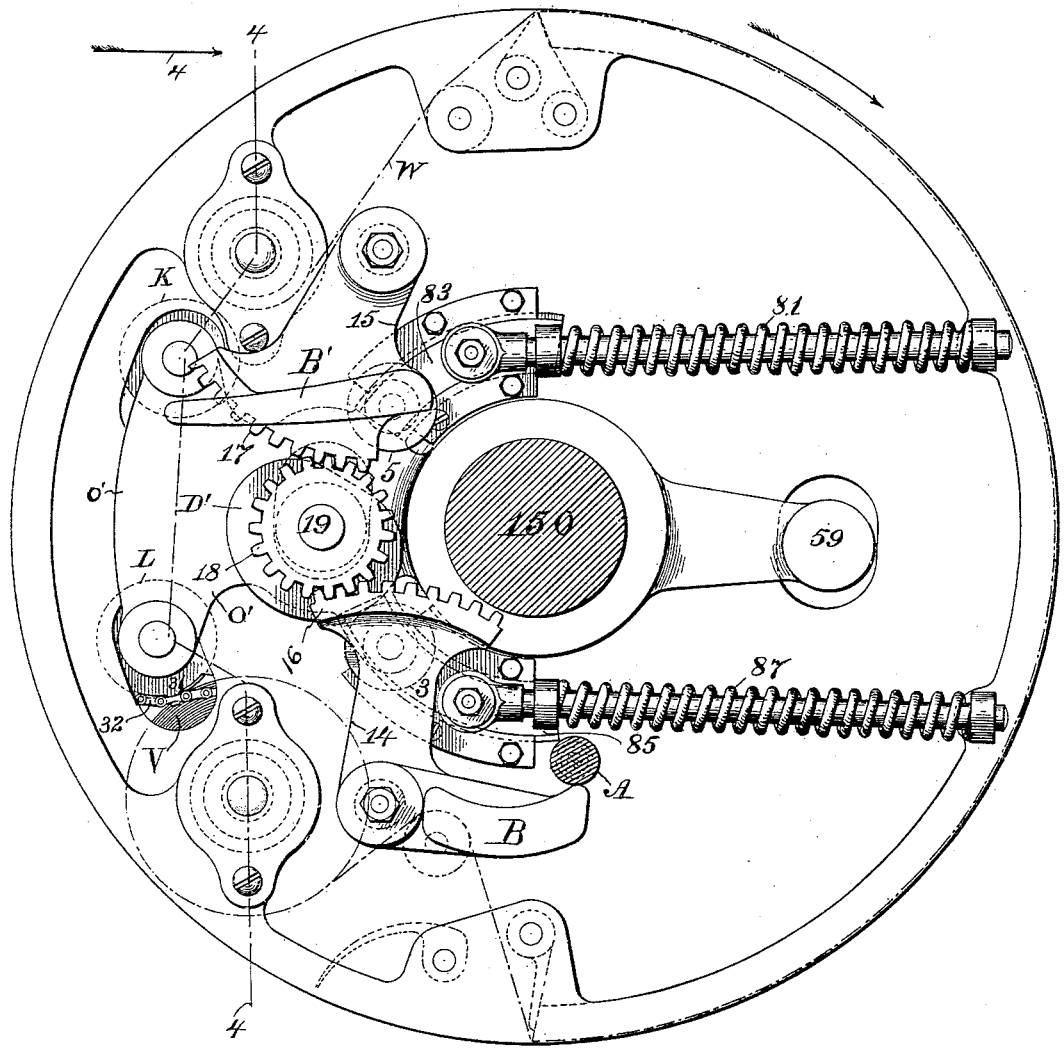
Figure 3:
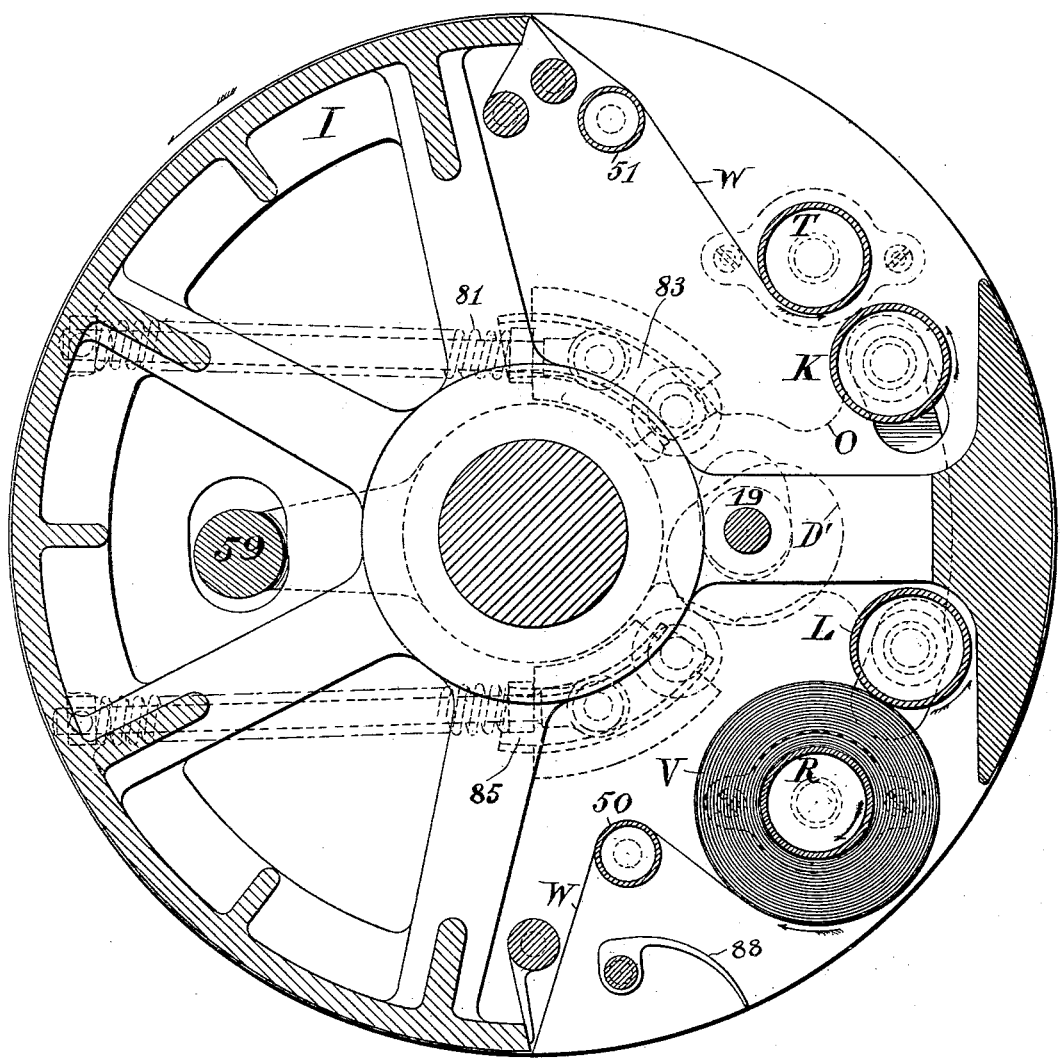
Figure 4:
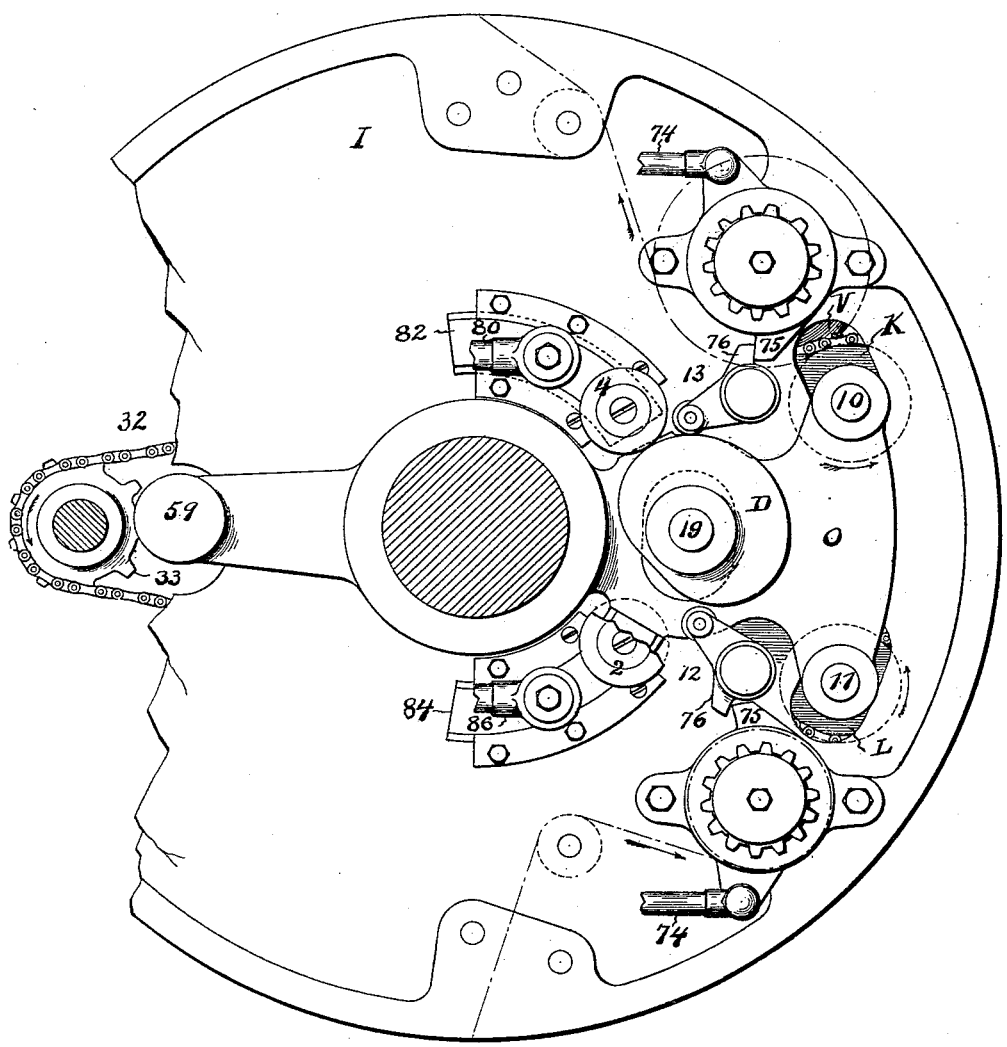

Figure 1 represents an elevation of one end of the second impression-cylinder of a perfecting printing-machine, and particularly that of a double-cylinder flat-bed perfecting printing-machine provided with these improved tympan appliances or mechanisms, the view being taken from the gear side of the machine and just within the side frame, as is indicated by the section-line 1 in Fig. 5, the direction in which the view is seen being indicated by the arrow 1 in Fig. 5. Fig. 2 is an elevation of the opposite end of said impression-cylinder, or as the same is seen from the non-gear or feeding side of the machine, looking in the direction of the arrow 2 in Fig. 5. Fig. 3 is a transverse sectional elevation of said impression - cylinder and its tympan appliances, the view being taken on the section-line 3 of Fig. 5 and as seen from the gear side of the machine, or when looking in the direction in which the arrows attached to the section-line 3 point. Fig. 4 is a view similar to Fig. 1, but with parts broken away and with the shifting mechanism adjusted so as to move the tympan in a direction contrary to that in which it is illustrated as moving in the other figures. Fig. 5 is a broken side elevation of said cylinder and its mechanisms, the view being taken on section-line 4 of Figs. 1 and 2 and illustrating the mechanisms as seen looking in the direction of the arrows 4 associated with said Figs. 1 and 2. Fig. 6 is an elevation of part of the end of the impression - cylinder at the gear side of the machine, the view being as seen looking in the direction in which the arrow 5 points in Fig. 5. Figs. 7, 8, and 9 illustrate the clutches for the tympan-rollers, which clutches are alike except that one is right handed and the other left handed, Figs. 7 and 8 being sectional views on the line 7 of Fig. 9 and showing the parts in two different positions, while Fig. 9 is a sectional elevation of one end of the tympan-shaft, taken on the section-line 9 of Fig. 7 and showing the clutch mechanism. Fig. 10 is an elevation, partly in section, on the section-line 10 of Fig. 11 of the clutch operating the measuring-rollers as seen from the gear side of the machine. Fig. 11 is a plan view of the same as seen on the section-line 11 of Fig. 10. Fig. 12 is an end elevation of the same as seen looking in the direction of the arrow 12 in Fig. 10. Fig. 13 is a plan view of a portion of the bearer 82 and its accessories. Figs. 14, 15, 16, and 17 are diagrams showing the method of changing the direction of the travel of the tympan-web at the end of its run in one direction, the views being taken from the feeding side of the machine. Fig. 18 is an inside facial view of the wheel 62, illustrating more particularly a means for adjusting the cam 52. Fig. 19 is a sectional view thereof, taken on the section-line 19 as seen in the direction indicated by the pointer attached to said section-line; and Fig. 20 is a bottom plan view as indicated by the arrow 20 associated with Fig. 18, showing more particularly the structure of the adjustable governing-guard or cam-guide 52. Figs. 21 and 22 represent a counting device for automatically operating the reversing mechanism.

In order that a general understanding of the invention may be had preliminary to a detailed description of the mechanisms embodying it, it should be stated that the impression-cylinder I may be provided with grippers 88, as is usual, whereby sheets are successively clamped to the cylinder laid onto that portion of it which is the impression-surface, and carried around upon it into contact with the printing-form, a tympan covering said impression-surface, so as to take up whatever ink offsets from the first printed side of said sheets. Before a repeated impression is made upon this tympan-protected impression-surface the mechanisms operate so as to cause an extent of tympan equal at least to a sheet's length to be shifted circumferentially over the impression-surface of the cylinder. This shifting of the tympan occurs at each second revolution of the cylinder, such a shifting of the tympan after each printing impression being repeated in one direction until a long tympan—say one equal to the length of two hundred sheets—has been progressively so shifted, whereupon the shifting mechanism is automatically reversed, so that it causes the tympan to be unwound and shifted in the contrary direction an equal number of times, and so on.

This tympan-shifting mechanism embodies the following principal parts: A long web W of tympan whose opposite ends are respectively secured to tympan-rollers T R and adapted to be unwound from one tympan-roller, as R, and wound up upon the other tympan-roller, as T, or vice versa, which tympan-rollers are located within the casing of the cylinder I, and the tympan W in passing from one tympan-roller, as R, to the other, as T, is led over a guiding-roller 50 within the cylinder, thence outside of the cylinder and over its impression-surface, thence into the cylinder and over a guiding-roller 51 to the surface of the other tympan-roller, as T, and vice versa, according to the direction in which the tympan may be moving. The winding-up movements of this tympan are effected by means of clutch mechanisms attached, respectively, to the shafts of the tympan-rollers T R, said clutch mechanisms being outside the head of the cylinder at the gear side of the machine. The loose member of each of these clutch mechanisms is of course at times locked fast to the tympan-roller shaft to drive the same, and at other times runs freely thereon, and the loose member of the clutch mechanism belonging to the shaft of the tympan-roller T is constantly rotated by means of a pinion 60, and the corresponding loose member of the clutch mechanism belonging to the shaft of the tympan-roller R is constantly driven by a pinion 61, attached thereto, which pinions 60 61 mesh with a stationary wheel 62, that is fixed to the cylinder-shaft journal-box 63. It will have been understood that the winding-up action of these tympan-rollers T R is alternative—that is to say, the tympan is wound up in one direction on the roller T and simultaneously unwound from the roller R, and when a complete unwinding of the same from the roller R has been effected a reverse operation causes this roller R to become a receiving or winding-up roller for the tympan from the delivering or unwinding roller T. In order to a clear understanding of this operation, we will consider the winding-up operation in one direction only, having reference to Fig. 3, as showing the initial position of the web of tympan. A description of how the web is unwound from the delivering-roller R and wound up upon the receiving-roller T in, say, two hundred, or, as shown herein, about two hundred and eighty successive step-like shifting movements before the reversal takes place will first be described. To admit of this operation, the driving action of the pinion 61 through the clutch connected with the shaft of the tympan-delivering roller R must first be suspended by unclutching said pinion from the shaft of the roller R, and the clutch mechanism connected with the tympan-receiving roller T must be put into clutching action in order that the pinion 60 may drive that roller to cause the winding-up operation. These novel clutches, as herein shown, will be described, although other clutch mechanisms may be substituted therefor without departing from the invention. One of these clutches—that associated with the tympan-roller T—will now be described with special reference to Figs. 7, 8, and 9, which show the clutches connected with the shaft of the roller T; but as the parts corresponding therewith on the shaft of the tympan-roller R are the same in structure they are marked with like letters of reference in order that this description may apply thereto wherever that mechanism is shown herein, Figs. 7 and 9 showing the clutch in its active position and Fig. 8 the same in its inactive or unclutched position.

The loose member M of the clutch mechanism has an annular outward projection to which is secured the driving-pinion 60, and which annular projection and pinion normally revolve freely upon a hub 64, that is keyed to the shaft 65 of the tympan-roller T. This hub carries radially-disposed tenons 66, (in this instance four,) upon which tenons segmental bearers 67 are so mounted that they may move slightly outward and inward upon these tenons as guiding-bearers. These bearers 67 project laterally within and circumferentially with respect to the loose member M and have broad and roughened surfaces in contact therewith, and they overhang arms 68, that are secured by pivots 69 to an oscillating ring 70, that moves on a hub 71 between the loose member M and a plate 72, to which plate 72 said hub 71 is attached, the said plate 72 being fixed to the cylinder-head by bolts 73. This fixed hub 71 projects from the plate 72 within the member M and extends to the radial tenons of the hub 64, and it carries at equidistant points around its surface, near its outer end, cam projections 8, upon which the inner faces of the arms 68 ride. The oscillating ring 70, carrying the overhanging arms 68, is moved so that the cam projections 8 of the hub 71 shall rock the arms or levers 68 when the same are carried over said projections by the movement of the ring 70, and thus force the segments 67 into frictional contact with the inner periphery of the loose member M of the clutch by the action of the spring-pressed rods 74, which are attached to ears fast upon said ring 70, the contrary movement of these rings 70 being effected by contact with their lugs 75, against which rocking tappets 76 are pressed at proper times by the cam D, as is shown in connection with the lug 75 of the oscillating ring 70 of the clutch mechanism connected with the tympan-roller R.

Understanding that when the web of tympan is to be unwound from the tympan-roller R and to be simultaneously wound up upon the tympan-roller T, the clutch mechanism connecting the driving-pinion 60 with the shaft of the tympan-receiving roller T being in active operation, as just described, that roller will be rotated to wind up the tympan-web, for the reason that the friction exerted between the roughened surfaces of the bearers 67 and the part M will be sufficient to so lock the parts together as to cause them to move in unison, while the smoother surfaces of the arms 68 in contact with the bearers 67, exerting less friction, will admit of the bearers 67 riding over them, while they continue to maintain the frictional adherence of the bearers 67 and the member M. This winding shifting movement of the tympan must, however, not only be controlled, but the time when it is to take place must be determined and the extent to which it is to be shifted must be governed. These objects are attained as follows: Two controlling-rollers K L, whose surfaces frictionally pay out and thus measure the extent of tympan shifted, are mounted in oscillating frames O O', so that the active controlling-roller L in this present-described movement shall be in frictional bearing contact with the periphery of the roll V of tympan being unwound, and the revolutions of this controlling-roller are such as to cause its periphery to roll in contact with the unwinding tympan-web to an extent that is equal to the length of tympan-web it is desired to move after each impression. These controlling-rollers K L have their shafts 10 11 journaled in the oscillating frames O O', which latter are hung on the main shaft 150 and counterbalanced, as by the weight-bar 59, connecting them. Whenever these oscillating frames O O' are moved to bring the controlling-roller L into contact with the roll V of tympan-web then carried by the unwinding tympan-roller R the controlling-roller K is simultaneously moved away from the tympan-receiving roller T, whereupon this controlling-roller L will be held in frictional contact with the periphery of the roll V of tympan-web on the tympan-delivering roller R by the action of the spring-seated rods 80 81, which are pivoted to curved bearers 82 83, that slide in curved guiding-ways attached to the heads of the cylinder and press against said oscillating frames, and the clutch mechanism connected with the shaft of said delivering-roller R will be simultaneously unclutched therefrom by the action of the cams D D', as follows: The action of these cams D D' is as follows: The cam D coöperates with the friction-rollers 2 4, and the cam D' coöperates with the rollers 3 5, while the cam D also moves the rock-arms 12 13 of the tappets 76 belonging to the clutch mechanisms, and the movement of these cams is a quarter-oscillation and then a long period of rest. While resting, as in Fig. 1, the high parts of these cams D D' bear against the friction-rollers 2 3, compress the springs on the rods 86 87, and hold the spring-pressed bearers 84 85 out of contact with the oscillating frames O O', and, through the rock-arm 12, the cam D releases the clutch connected with the shaft of the tympan-roller R. When these cams D D' move to carry the mechanisms to and maintain them in the positions in which they are in most instances illustrated, their action is to move their high parts away from the friction-rollers 4 5, and thus release the bearers 82 83 and permit them to abut against the oscillating frames O O', and thus press the same in a direction toward the tympan-roller R and away from the roller T. The cam D also releases the rock-arm 13, and the clutch mechanism simultaneously becomes active with respect to the tympan-roller T through the action of the spring-pressed rod 74. When the oscillating movement of these cams D D' in this direction is complete, they will have reached the positions shown in Figs. 1 and 2, which are views of opposite ends of the cylinder, the cam D having pressed against and caused the rock-arm 12 to rock the ring 70 and thus throw the clutch mechanism actuated thereby out of action with respect to the tympan-roller R, and at the same time the spring-pressed bearers 84 85, pivoted to the spring-seated rods 86 87, are forced away from and held out of contact with said oscillating frames O O' by cams D D'.

With the mechanisms in the positions last described the tympan-shifting apparatus is in condition to be repeatedly operated to shift the tympan a large number of times—say two hundred, or, as shown herein, about two hundred and eighty—according to the length which the tympan-web has, said shifting being performed, as before stated, at every second revolution of the impression-cylinder and being made to an extent that is equal to the impression-surface of the form with which said cylinder coöperates. The shifting movements of this tympan-web are controlled by the paying-out or feeding action of the controlling-roller L, which is rotated to frictionally drive and unwind the rolled web V on the tympan-delivering roller R while the companion controlling-roller K is out of action with respect to the tympan-receiving roller T, and the latter is rotated by its driving-pinion 60 (then frictionally coupled to its shaft) to wind up the paid-out web, the positive driving action of this pinion 60, which might otherwise tear the web, being compensated for to the extent that it shall only roll up the web sufficiently to draw it snugly and tightly around the impression-surface of the cylinder, and thus keep it taut, by the slipping action which takes place in the mechanism frictionally clutching this driving-pinion 60 with the shaft of the tympan-carrying roller T. These controlling-rollers K L are driven by means of sprocket-wheels 30 31, carried on their shafts just inside the cylinder-head, with which a sprocket-driving chain 32 coacts, said chain running over a driving sprocket-wheel 33 and being intermediately supported by guide-rollers 34 35. The driving sprocket-wheel 33 is fast on a short shaft 36, that carries a driving-pinion 37, running loosely on the outer end of said shaft, where it meshes with and is positively driven by the fixed wheel 62. As this driving-pinion 37 constantly revolves and as the controlling-roller must intermittingly revolve, said pinion is provided with a clutch, whereby it may be periodically coupled to the shaft 36. The loose member 40 of this clutch is a hollow-rimmed member fast to the hub of the pinion 37 and extends inwardly, while the fast portion 41 of this clutch is a hollow-rimmed member secured by a sleeve to the shaft 36 and extends toward the loose member 40, the two constituting a hollow structure for containing the interior spring-bearer 29, which is secured to the sleeve of the fast member 41. They are set apart, so as to provide between their facing flanges a space for the interposition of lugs 42, projecting inwardly from the exterior friction-band 39, which friction-band 39 embraces this clutch mechanism and has one end fast to a puppet-head 43, secured to a rock-arm 44, that is fast to a rocking sleeve 9, that vibrates on a pin 45, fast to the cylinder-head, while the opposite end of said friction-band 39 is pivoted to a rock-arm 46, also extending from said rocking sleeve 9, which rocking sleeve 9 and connected parts are maintained in one position by means of the spring-seated rod 47, which, attached to a rock-arm 28, extending from the sleeve 9, constantly presses outwardly and normally tightens the friction-band 39.

The spring-bearer 29 normally tends to press against the interior surface of the inwardly-projecting flange of the loose part 40 of the clutch mechanism to frictionally couple the two together, as in Fig. 10. The friction-band 39 is normally maintained in its tightened position by means of the spring-seated rod 47, which, holding the parts in their dotted positions, (shown in Fig. 10,) causes the lugs 42 to press inwardly against the spring 29 and hold it away from or out of contact with the inner peripheries of said fast and loose parts of the clutch, said band 39 simultaneously contacting with the exterior surface of the fast part 41 of the clutch and acting as a friction-brake to arrest the rotation of the shaft 36 and suspend any movement of the controlling-roller L. Thus the driving-pinion 37 being normally unclutched from the shaft 36 it follows that the tympan-controlling rollers K L are normally stationary. This friction-band 39 is periodically loosened and expanded to permit the spring 29, through the clutch mechanism, to couple the driving-wheel 37 with the shaft 36 by means of an arm 48, that projects from the rocking sleeve 9 and carries a friction-bowl 49, which normally runs inside of a fixed governing-guard or cam-guide 52, which projects from the inner face of the fixed wheel 62, as appears by the dotted lines in Fig. 10. So long as the friction-bowl travels normally or within the governing-guard or cam-guide 52 the tympan-controlling rollers are stationary and the tympan is not shifted, but when the bowl 49 is caused to travel on the outer side of the said guard or guide 52 it will be raised to its full-line position, (shown in Fig. 10,) thus expanding the friction-band 39, causing the lugs 42 to relieve the spring 29 and the latter to bear upon the loose part 40 of the clutch mechanism and couple the driving-pinion 37 to the shaft 36, consequently driving the controlling-roller L so long as the governing-guard or cam-guide 52 maintains this relation of the parts. According, therefore, to the length of the said guard or guide 52 will be the duration of the described coupling action with respect to the circumference of the cylinder I, and consequently the number of turns of the controlling-roller L, and the resulting surface movement of said roller and the tympan it governs. This guard or guide therefore governs the extent to which the tympan is shifted at each movement. In order to determine the time when this shifting movement shall take place, the entrance of the bowl 49 onto the governing guard or cam-guide 52 is accomplished by a switch 53, the time of the action of which is determined by a cam 58. This switch slides on a pin 54 and is actuated by a guiding-pin 55, that reciprocates in a guiding-sleeve 56, said pin 55 having a head 57, from which a toe projects into the groove of a cam 58, that is fast upon and revolved by a wheel 78, which is driven outside of the framework by a pinion 77 on the shaft 150 of the impression-cylinder. The pinion 77 being half the size of the wheel 78 it drives, it follows that the periodical movement of this switch 53 is at every second revolution of the impression-cylinder, whence it results that the friction-roller 49, and hence the arm 48, is maintained within the fixed guard or guide 52 by the action of the spring-rod 47 during one revolution of the impression-cylinder, as is shown in dotted lines in Fig. 10, and is thus caused to contact with and ride over switch 53, and hence onto the outer periphery of the fixed guard or guide 52, as shown in full lines in Fig. 10, during each alternate revolution of the impression-cylinder. When the arm 48 and its friction-roll 49 travel within the fixed guard or guide 52, the tympan remains stationary, and this is during the printing revolution of the impression-cylinder I, and when the said friction-roller runs on the outer side of the fixed guard or guide 52 the tympan-shifting mechanism becomes active and operates to shift the tympan at a period which is during the second or non-printing revolution of the impression-cylinder. With the parts thus acting it is obvious that during each second or non-printing revolution of the impression-cylinder I the tympan will be shifted a distance equal to the extent of circumferential travel or peripheral movement of the controlling-roller L, the surface of which bears frictionally under the pressure of the spring-rods 80 and 81 upon the constantly-decreasing periphery of the unwinding roll V of tympan-web carried by the delivering-roller R, the extent of which measuring movement or circumferential travel of the periphery of the controlling-roller being determined by the length of the fixed guard or guide 52, which governs the period of time in which the chain 32 shall drive said roller, and consequently the extent to which the tympan is moving, or, otherwise stated, the duration of time in which the clutch mechanism connected with the driving sprocket-wheel 33 is in action.

The extent to which the tympan-carrying rollers R T will revolve at each shifting movement of the tympan will vary, of course, as the rolled tympan-web V, carried by the delivering-roller R, diminishes in size, and the shifting operations will be repeated so long as there is tympan-web upon the delivering-roller R to be thus shifted; but as the quantity that can be carried by one roller is necessarily a limited one it is requisite for a continuous operation that when the tympan upon the delivering-roller R is about to become exhausted by being shifted or transferred to and wound up upon the tympan-receiving roller T the mechanisms shall be reversed in their operation and said tympan-web shall be shifted or fed by the repeated step-like shifting movements described in the opposite direction, in which operation the tympan-carrying roller T becomes the delivering-roller and the roller R becomes the tympan-receiving roller.

It is found to be practical in the size of the machine illustrated to provide a tympan-web that may be shifted distances equal to the lengthwise extent of the impression-surface two to three hundred times in one direction before it is reversed and shifted two to three hundred times in the opposite direction.

As this tympan-shifting mechanism, as shown herein, is arranged to shift the tympan two hundred times and then be reversed it is apparent, since every other revolution of the impression-cylinder is its printing period, that the reversing of the tympan-shifting devices must take place after four hundred revolutions of the cylinder have been made. To accomplish this reversal in order that the mechanism shall feed in the opposite direction from that which has been described, as is illustrated in Fig. 4, it is obvious that the oscillating frames O O' must be swung to cause the controlling-roller K to become active by frictionally contacting with the periphery of the rolled tympan-web V, then accumulated upon the tympan-carrying roller T, and also that the friction-clutch connected with the shaft of the tympan-roller R shall be released or put out of action and that the friction-clutch connected with the tympan-roller T shall be put into action. The means accomplishing this is a tripping-bolt A, that is arranged to reciprocate in one of the side frames 100 on the feeding side of the machine, its movement being effected by any common means for producing reciprocation after any predetermined number of revolutions of the moving instrumentalities in the machine. The office of this tripping-bolt is (after each two hundredth impression or other predetermined number, according to the length of tympan that may be carried upon its tympan-rollers) to trip the operating mechanisms of said tympan-rollers, so that the tympan may be caused to travel in a contrary direction to that in which it is running at the time of the tripping operation. This tripping-bolt A is arranged to slide in the side frame at the feeding side of the machine, and it is provided with means for causing it to be reciprocated, and thus protruded inward for action upon the mechanisms at an appropriate revolution of the impression-cylinder, as, say, the four-hundredth or, as shown herein, the five-hundred and sixty-second. Said means may be automatic, if desired, and actuated by suitable connections from a moving part of the machine or be operated by hand by the attendant, a suitable index showing the approach of the four-hundredth revolution being provided, if desired. A mechanism by which the proper movement of the bolt A may be effected is illustrated in Figs. 21 and 22. Upon a stud 104, fixed to the frame, is mounted, so as to rotate, a cam 105, which acts upon a segmental lever 106 and causes it to vibrate twice during each revolution of the cam. The cam 105 carries a gear-wheel 103, which engages with a gear-wheel 102 upon the shaft of the cylinder. The segmental lever 106 is geared with a similar lever 107, which is pivoted on the shaft of a multiplex ratchet-wheel composed of two ratchet-wheels 109 and 110 and a cam-disk 111, and this lever 107 carries, pivoted to a stud projecting from it, three pawls 112 113 114. The ratchet-wheel 110 in this instance is provided with thirty teeth, and it has attached to it, at one side next to the ratchet-wheel 109, a guard-disk 116, having in its periphery one recess. The ratchet-wheel 109 in this instance has thirty-one teeth, and between it and the cam-disk 111 there is a guard-disk 115, having one recess in its periphery. This ratchet-wheel 109, guard-disk 115, and cam-disk 111 are attached together as a single member. At each revolution of the cylinder the pawl 112 moves the ratchet-wheel 110 a distance of one tooth, during which revolution the pawl 113 rides idly upon the plane periphery of the guard-disk 116 and the pawl 114 rides idly upon the plane periphery of the guard-disk 115. Thirty onward movements of the ratchet-wheel 110 are thus made to cause it to complete one revolution; but as its revolution is completed at its thirtieth movement the pawl 113 simultaneously drops in the single recess of the guard-disk 116 and into one of the teeth of the ratchet-wheel 109, so that at the making of its thirtieth movement or the completion of a revolution of the ratchet-wheel 110 the ratchet-wheel 109 is moved one tooth. As the lever 107 is again moved the pawl 112 will alone be active, the pawls 113 and 114 riding idly upon the plane peripheries of the guard-disks 116 and 115. When thirty movements of the ratchet-wheel 110 are again made, the pawl 113 will again move the ratchet-wheel 109 one tooth. When this operation has been performed thirty times, the pawl 113 by moving the ratchet-wheel forward will move the projection 117 on the cam-disk 111 into position to operate the lever 118, pivoted at 119, which lever at its free end is pivoted to the bolt A and presses the latter inwardly, when it is operated upon by the cam 117, so that it will stand in the path of the cams B and B'. The bolt A is normally pressed outward by spring 120 on the return stroke of the pawls after the thirtieth complete revolution of the ratchet-wheel 110, and when the projection 117 is in operative position the pawl 114 will drop into the recess of the guard-disk 115, and upon its next forward movement it will move the guard-disk and the cam-disk 111, attached thereto, so that the projection 117 will be carried out of operative position, thus permitting the spring 120 to withdraw the bolt A before it has acted upon the second of the pair of cams B B'. This movement will also move the ratchet-wheel 109 onward its thirty-first tooth. The gear-wheels 102 103 and the number of the teeth upon the ratchet-wheel are so adjusted to each other that the bolt A will be protruded alternately at different parts of the revolution of the cylinder, so as to operate alternately upon the cams B B', as will be hereinafter pointed out. In the construction illustrated in the drawings the gear-wheel 102 makes two and one-half revolutions to two revolutions of the gear-wheel 103, and the ratchet-wheels 110 and 109 have, respectively, thirty and thirty-one teeth. From this it results that nine hundred movements of the segmental lever 106 intervene between two successive operative positions of the projection 117. Since the segmental lever 106 is moved twice during each revolution of the cam 105, this will be four hundred and fifty revolutions of the cam 105, which is equivalent to five hundred and sixty-two and one-half revolutions of the gear-wheel 102 and the cylinder-shaft. It therefore results that the successive periods between operative positions of the projection 117 begin with diametrically opposite points in the cylinder opposite to the bolt A. Of course a great variety of adjustments may be adopted for securing this result and the frequency with which the bolt A is protruded by the counting mechanism may be fixed as desired. Thus the reversal may be provided at each four hundred revolutions of the cylinder, as hereinabove suggested, or at other periods. In the mechanism shown the reversal occurs during each five hundred and sixty-second revolution. This tripping-bolt A when moved (see Figs. 2 and 5) is projected into the pathway of levers B B', and when said levers contact with the bolt A they will rock the segment-arms 14 15 and cause the segments 16 or 17, as the case may be, to rotate the pinion 18 on the shaft 19, carrying the cams D' D, which cams, as we have heretofore seen, rock the oscillating frames O O' and actuate the clutch mechanisms connected with the tympan-rollers T R. In order to better illustrate this reversing operation, the diagrams Figs. 14 to 17 have been introduced. In the main illustrations the mechanisms are shown in the positions they have when the tympan-web W is being periodically shifted by being unwound from the tympan-roller R, operating as a delivering-roller, and wound up upon the tympan-roller T, acting as a receiving-roller, said positions having been attained by the movements illustrated in Figs. 14 and 15, where, Fig. 14, the lever B is shown as contacting with the tripping-bolt A, and in passing over said bolt A moving the mechanisms to the position shown in Fig. 15, which is that illustrated in the general views and the one in which said mechanisms remain during, say, two hundred, more or less, shifting movements of the tympan, or until the reversing of the direction of the shifting movement of the tympan is to be effected. It will be observed that when the lever B is moved, as just described, it is forced out of the pathway which intercepts the bolt A, while the lever B' is simultaneously forced into the pathway which will intercept that bolt A when the same is again protruded therein, the parts then standing, as is indicated in Fig. 15, until it is required to reverse them. When the reversing operation is to take place and the tympan-web is to be shifted step by step in a contrary direction, the bolt A is protruded inwardly during the appropriate—say the four-hundredth—revolution and intercepts the lever B', carried by the segment-arm 15, as in Fig. 16, thus causing the segment 17 to rock in the direction of its arrow and to rotate the pinion 18 in the direction of its arrow, and consequently move the cam D' and its companion D in a like direction, said mechanisms being left standing in the positions shown in Fig. 17, as the lever B' clears the bolt A, the lever B having then been moved into the pathway of the bolt A ready to engage therewith when said bolt is next protruded inwardly, or as illustrated in Fig. 14. After operating the cam B' the bolt A is withdrawn by the cam 105 before it engages with the cam B.

In the positions of the parts shown in Fig. 15 and in the main views (see Figs. 1 and 2) the cams D D' will by contact with the friction-rollers 2 3 be holding the spring-arms 86 87 and the bearers 84 85 out of pressing contact with the oscillating frames O O', thus allowing the spring-seated bearers 82 83 to press against said frames, so as to cause the controlling-roller L to bear upon the rolled tympan-web V on the tympan-roller R, and the cam D to bear upon the rock-arm 12, so as to cause the tappet 76 to bear on the lug 75, and thus uncouple or relieve the clutching mechanism connected with the shaft of the tympan unwinding or delivering-roller R, and simultaneously allow the companion rock-arm to move the tappet 76 away from the lug 75 and allow the spring-seated rod 74 to move the ring 70, and thus render active the friction-clutch connected with the tympan wind-up or receiving-roller T. Now when the reversing operation is to be effected, as illustrated in Figs. 4, 16, and 17, the cams D D' will relieve the spring-seated bearers 84 85, so that by their contact with the oscillating frames O O' they will move the same into a position that will carry the controlling-roller K into and hold the same in spring-pressing or frictional contact with the rolled web V, now wound up upon the tympan-carrying roller T, now acting as a receiving-roller, simultaneously moving the spring-bearers 82 83 out of pressing contact with said oscillating frames O O' and holding the same in that position during the four hundred revolutions referred to. Simultaneously the cam D allows the rock-arm 12 to swing the tappet 76 out of contact with the lug 75 on the ring 70, thus permitting said ring to move under the driving action of its spring-seated rod 74 and render active the friction-clutch connected with the shaft of the tympan-carrying roller R, and simultaneously this cam D moves the companion rock-arm 13 to perform the reverse operation upon the ring 70 of the clutch mechanism connected with the tympan-carrying roller T, thus unclutching the same by bearing the tappet 76 upon the lug 75 against the pressure of the spring-seated rod 74. In these positions the frictionally-pressed controlling-roller K will become active as the means through which the shifting movement of the tympan in the contrary direction is effected, the same being driven through the action of the sprocket-chain 32, and the operation of the various parts being the same as has heretofore been described with respect to the movement of the tympan in the opposite direction. In this movement of the tympan the tympan-carrying roller T becomes the delivering-roller and the tympan-carrying roller R becomes the receiving-roller, which tympan-shifting operations are carried on until the time arrives when the tympan-web upon the tympan-delivering roller T is about being exhausted and requires to be shifted in the contrary direction, at which time the mechanism controlling the tripping-bolt A acts to thrust the same into the pathway of the lever B, reverse the mechanisms, and cause the first shifting operation described to be again performed.

It is obvious that the clutching mechanisms may have substituted for them other appropriate constructions; but it is to be observed that the action of the clutching mechanism connected with each of the tympan-carrying rollers T R is to transmit the power that drives the one of said rollers which is acting as a wind-up or receiving roller, and as this power is applied through the pinions 60 61 and the size of the roll V of tympan-web constantly varies, while that of the said pinions is a fixed quantity, it results that the said clutches must be of such a construction as to allow a slipping between the loose and fast parts thereof when so far coupled as to be in driving-contact.

It is obvious that by shortening the length of the fixed governing guard or cam-guide 52 in any of the common ways of making cams capable of a longer and shorter activity the duration of the time when the tympan moves may be increased, and thus its shifting extent be lengthened. One good way of accomplishing this result is by having removable parts, or one part sliding upon another to fixed positions, or passages through the said guard or guide controlled by a switch would be effective, and in illustration of this I have selected the modification where one part of the governing guard or cam-guide 52 slides upon another part, showing the same in Figs. 18 to 20. Here the main part of this guard or guide 52 is fixed and its forward portion 90 is divided widthwise, so as to form a way upon which a detached or separable portion 91 of said guard may slide circumferentially, the same being provided with an arm 95 for receiving a fastening-screw 93, the shank of which runs in a slot 92, formed in the web of said wheel 62. This movable portion 91 may thus be adjusted at any required position within the limits of its movement. (Indicated by the dotted lines in Fig. 18.) Furthermore, when the guard or guide-cam 52 is thus capable of a number of adjustments this governing of the extent of movement of the tympan may be aided by increasing the size of the sprocket-wheel driving the chain 32, so that the tympan may be moved a greater or less distance than is normally provided for its shifting action by the mechanisms as illustrated.

The term "positive driving" used in the specification indicates driving by mechanism connected with a moving part of the machine as contrasted with driving by means of spring-power. So, too, the term "power-operated mechanism" is used in the claims to indicate mechanism operated through connection with a moving part of the machine as contrasted with mechanism operated by a spring.

What I claim is—

1. The combination with an impression-cylinder and two tympan-carrying rollers mounted to revolve therein and between which the tympan is intermediately stretched over the impression-surface of said cylinder, of a mechanism constructed and operating to shift said tympan from roller to roller over the impression-surface after each impression and means acting automatically to reverse the tympan-shifting action of said mechanism so that the same shall operate to shift said tympan first in one direction and then in the other, substantially as described.

2. In a printing-machine, the combination with an impression-cylinder and two tympan-carrying rollers mounted to revolve therein and from which the tympan is intermediately stretched over the impression-surface of the cylinder, of a power-operated driving mechanism for the wind-up or receiving roller and a friction-clutch interposed between said driving mechanism and the shaft of the tympan-receiving roller for shifting the tympan from off the delivering-roller onto the receiving-roller, and means for reversing the tympan-shifting action of said mechanism so that it shall operate to shift said tympan first in one direction and then in the other, substantially as described.

3. In a printing-machine, the combination with an impression-cylinder and two tympan-carrying rollers mounted to revolve therein and from which the tympan is intermediately stretched over the impression-surface of the cylinder, of a power-operated driving mechanism for the wind-up or receiving roller and a friction-clutch interposed between said driving mechanism and the shaft of the tympan-receiving roller for shifting the tympan from off the delivering-roller onto the receiving-roller, means for reversing the tympan-shifting action of said mechanism so that it shall operate to shift said tympan first in one direction and then in the other, and mechanism for controlling the movement of the tympan so that a portion of the tympan shall be moved over the whole extent of the printing-surface after each printing impression, substantially as described.

4. The combination with an impression-cylinder and two tympan-carrying rollers mounted to revolve therein and between which the tympan is intermediately stretched over the impression-surface of said cylinder, of a mechanism constructed and operating to shift said tympan from roller to roller, each shifting movement carrying a portion of the tympan over the whole extent of the printing-surface after each printing impression, and means acting automatically to reverse the tympan-shifting action of said mechanism so that it shall operate to shift said tympan first in one direction and then in the other, substantially as described.

5. In a printing-machine, the combination with an impression-cylinder and two tympan-carrying rollers mounted to revolve therein and from which the tympan-web is intermediately stretched over the impression-surface of said cylinder, of a power-operated driving mechanism for the wind-up or receiving roller and a friction-clutch interposed between said driving mechanism and the shaft of the tympan-receiving roller for shifting the tympan from off the delivering-roller onto the receiving-roller, and means acting automatically to reverse the tympan-shifting action of said mechanism so that it shall operate to shift said tympan first in one direction and then in the other, substantially as described.

6. In a printing-machine, the combination with an impression-cylinder and two tympan-carrying rollers mounted to revolve therein and from which the tympan-web is intermediately stretched over the impression-surface of said cylinder, of a power-operated driving mechanism for the wind-up or receiving roller for shifting the tympan from off the delivering-roller onto the receiving-roller, a friction-clutch interposed between said driving mechanism and the shaft of the tympan-receiving roller, and a controlling-roller acting by surface contact with the rolled tympan to control its shifting movement substantially as described.

7. In a printing-machine, the combination with an impression-cylinder and two tympan-carrying rollers mounted to revolve therein and from which the tympan-web is intermediately stretched over the impression-surface of said cylinder, of a power-operated driving mechanism for the wind-up or receiving roller for shifting the tympan from off the delivering-roller onto the receiving-roller, a friction-clutch interposed between said driving mechanism and the shaft of the receiving-roller and a controlling-roller rotated in contact with the rolled tympan to control the shifting movement of the tympan, substantially as described.

8. In a printing-machine, the combination with an impression-cylinder and two tympan-carrying rollers mounted to revolve therein and from which the tympan-web is intermediately stretched over the impression-surface of said cylinder, of a power-operated driving mechanism for the wind-up or receiving roller for shifting the tympan from off the delivering-roller onto the receiving-roller, a friction-clutch interposed between said driving mechanism and the shaft of the receiving-roller, a controlling-roller rotated in contact with the rolled tympan to control the shifting movement of the tympan, and means governing the extent of surface movement of said controlling-roller during each shifting operation, substantially as described.

9. In a printing-machine, the combination with an impression-cylinder and two tympan-carrying rollers mounted to revolve therein and from which the tympan-web is intermediately stretched over the impression-surface of said cylinder, of a power-operated driving mechanism for the wind-up or receiving roller for shifting the tympan from off the delivering-roller onto the receiving-roller, a friction-clutch interposed between said driving mechanism and the shaft of the receiving-roller, a controlling-roller rotated in contact with the rolled tympan to control the shifting movement of the tympan, means governing the extent of surface movement of said controlling-roller during each shifting operation, and, means determining the relative time of the action of the controlling-roller, substantially as described.

10. The combination with an impression-cylinder and two tympan-carrying rollers mounted to revolve therein and between which the tympan-web is intermediately stretched over the impression-surface of said cylinder, of a power-operated driving mechanism for each of said rollers, a friction-clutch interposed between each of said driving mechanisms and the shaft of the roller with which it is associated, and means for simultaneously connecting one friction-clutch mechanism with its shaft and disconnecting the other friction-clutch mechanism from its shaft, substantially as described.

11. The combination with an impression-cylinder and two tympan-carrying rollers mounted to revolve therein and between which the tympan-web is intermediately stretched over the impression-surface of said cylinder, of a power-operated driving mechanism for each of said rollers, a friction-clutch mechanism intermediate the driving mechanism and the shaft of each of said rollers, two controlling-rollers the rotation of which controls the shifting movement of the tympan, and means alternately moving said rollers into coactive relation with the tympan-rollers, substantially as described.

12. The combination with an impression-cylinder and two tympan-carrying rollers mounted to revolve therein and between which the tympan-web is intermediately stretched over the impression-surface of said cylinder, of a constantly-operating driving mechanism associated with the shaft of each of said rollers, a friction-clutch mechanism intermediate the driving mechanism and shaft of each of said rollers, two controlling-rollers rotated to control the shifting movement of the tympan, means moving the controlling-rollers alternately into coactive relation with the tympan-carrying rollers to reverse the direction of its movement, a power-operated driving mechanism for the controlling-rollers, and a coupling connecting said driving mechanism and the driving-shaft operating said controlling-rollers, substantially as described.

13. In a printing-machine, the combination with an impression-cylinder, two tympan-carrying rollers mounted to revolve therein and between which the tympan-web is intermediately stretched over the impression-surface of the cylinder, a constantly-operating driving mechanism associated with the shaft of each of said tympan-rollers, a friction-clutch mechanism intermediate said driving mechanism and the shaft of each of said rollers, means simultaneously connecting one friction-clutch mechanism with the shaft of one of the tympan-rollers and disconnecting the other friction-clutch mechanism from its shaft, of two controlling-rollers rotated to control the shifting of the tympan, substantially as described.

14. In a printing-machine, the combination with an impression-cylinder, two tympan-carrying rollers mounted to revolve therein and between which the tympan-web is intermediately stretched over the impression-surface of said cylinder, a constantly-operating driving mechanism associated with the shaft of each of said tympan-rollers, a friction-clutch mechanism intermediate said driving mechanism and the shaft of each of said rollers, and means simultaneously connecting one friction-clutch mechanism with the shaft of one of the tympan-rollers and disconnecting the other friction-clutch mechanism from its shaft, of two controlling-rollers rotated to control the shifting of the tympan, means moving them alternately into coactive relation with the tympan-carrying rollers to reverse the direction of its movement, a power-operated driving mechanism for the controlling-rollers and a coupling connecting said driving mechanism with the shaft operating said controlling-rollers, substantially as described.

15. The combination with the impression-cylinder and the tympan-carrying rollers, of means for shifting the tympan from one to the other roller, the controlling-rollers and means for operating them, and the oscillating frame and means for operating it, substantially as described.

16. The combination with the impression-cylinder and the tympan-carrying rollers, of means for shifting the tympan from one to the other roller, the controlling-rollers, and means for operating them, the oscillating frame, spring-bearers therefor, and means for moving said frame substantially as described.

17. The combination with the impression-cylinder and the tympan-carrying rollers, of means for shifting the tympan from one to the other roller, the controlling-rollers and means for operating them, the oscillating frame, spring-bearers therefor and cams for moving said frame, substantially as described.

18. The combination with the impression-cylinder, the tympan-carrying rollers, friction-clutches for the shafts of the latter and means for driving the clutches, of controlling-rollers and means for operating them, a cam for moving them into position and intermediate devices connecting with said clutches, substantially as described.

19. The combination with the impression-cylinder, the tympan-carrying rollers and friction-clutches for the shafts of the latter and means for driving the clutches, of controlling-rollers and means for operating them, a cam for moving them into position, intermediate devices connecting with said clutches, and an oscillating frame, substantially as described.

20. The combination with the impression-cylinder, tympan-carrying rollers, friction-clutches for their shafts, power-operated mechanism for driving one member of said clutches, and means for moving the other clutch members into and out of action, of a controlling-roller, a clutch for its driving-shaft, power-operated mechanism for driving one member of said clutch, and means for moving the other clutch member into and out of action, substantially as described.

21. The combination with the impression-cylinder, tympan-carrying rollers, friction-clutches for their shafts, power-operated mechanism for driving one member of said clutches, and means for moving the other clutch members into and out of action, of controlling-rollers, a clutch for their driving-shaft, power-operated mechanism for driving one member of said clutch, and means for moving the other clutch member into and out of action, substantially as described.

22. The combination with the impression-cylinder, tympan-carrying rollers, friction-clutches for their shafts, power-operated mechanism for driving one member of said clutches, and means for moving the other clutch members into and out of action, of controlling-rollers, a clutch for their driving-shaft, power-operated mechanism for driving one member of said clutch, means for moving the other clutch member into and out of action, an oscillating frame for positioning said controlling-rollers, and means for moving said frame substantially as described.

23. The combination with the impression-cylinder, tympan-carrying rollers, friction-clutches for their shafts, power-operated mechanism for driving one member of said clutches, and means for moving the other clutch members into and out of action, of controlling-rollers, a clutch for their driving-shaft, power-operated mechanism for driving one member of said clutch, means for moving the other clutch member into and out of action, an oscillating frame for positioning said controlling-rollers, and a cam for moving said frame, substantially as described.

24. The combination with an impression-cylinder, of tympan-carrying rollers and controlling-rollers, a driving-shaft for the controlling-rollers, sprocket driving connections between said driving-shaft and the controlling-rollers, an oscillating spring-pressed frame for the controlling-rollers, power-operated driving mechanism for said driving-shaft, and a clutch for connecting and disconnecting said shaft and driving mechanism, substantially as described.

25. The combination with a tympan stretched from carrying-rollers mounted in an impression-cylinder so as to cover the impression-surface thereof, of shifting mechanisms for moving said tympan over the impression-surface, and a cam of variable length for adjusting the action of said shifting mechanisms so as to vary the time during which said tympan is moved at each shifting operation, substantially as described.

26. The combination with the shaft 65, hub 64 fast thereto, clutch member M loose thereon, and its bearers 67, of a fast cam-hub 71, ring 70 oscillating thereon and carrying pivoted arms 68, substantially as described.

27. The combination with an impression-cylinder, of two tympan-carrying rollers mounted to rotate therein and between which the tympan is intermediately stretched over the impression-surface of said cylinder, mechanism constructed and operated to shift the tympan from roller to roller over the whole extent of the impression-surface after each impression, and mechanism driven independently of the tympan-rollers, whereby the length of tympan shifted at each movement thereof is controlled, substantially as described.

28. The combination with an impression-cylinder, of two tympan-carrying rollers mounted to rotate therein and between which the tympan is intermediately stretched over the impression-surface of said cylinder, a power-operated mechanism acting constantly through one or another friction-clutch to rotate one or the other of the carrying-rollers when acting as the winding or receiving roller, and mechanism for intermittently preventing the winding action, substantially as described.

29. The combination with an impression-cylinder, of two tympan-carrying rollers mounted to rotate therein and between which the tympan is intermediately stretched over the impression-surface of said cylinder, and a power-operated mechanism acting through one or another friction-clutch to rotate one or the other of the carrying-rollers when acting as the winding or receiving roller, and mechanism driven independently of the tympan-rollers, whereby the length of tympan shifted at each movement thereof is controlled, substantially as described.

30. The combination of an impression-cylinder, mechanism carried by the cylinder for supporting a tympan-web, mechanism for causing a tympan-shifting action of the supporting mechanism, and mechanism driven independently of the tympan-supporting mechanism for controlling the length of tympan shifted at each movement thereof, substantially as described.

31. The combination of an impression-cylinder, mechanism carried by the cylinder for supporting a tympan-web, power-operated driving mechanism for causing a tympan-shifting action of the supporting mechanism, a shifting movement occurring after each impression sufficient to carry a portion of the tympan over the whole extent of the impression-surface, and mechanism driven independently of the tympan-supporting mechanism for controlling the length of tympan shifted at each movement thereof, substantially as described.

32. The combination of an impression-cylinder, mechanism carried by the cylinder for supporting a tympan-web, power-operated driving mechanism for causing a tympan-shifting action of the supporting mechanism, a shifting movement occurring after each impression sufficient to carry a portion of the tympan over the whole extent of the impression-surface, and means for automatically reversing the tympan-shifting action of said driving mechanism, substantially as described.

In testimony whereof I have hereunto set my hand in the presence of two subscribing witnesses.

LUTHER C. CROWELL.

Witnesses:
H. T. MUNSON,
A. L. KENT.